UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

PROCESS OF MAKING ACETYL-CELLULOSE PLASTIC COMPOUNDS.

1,226,341. Specification of Letters Patent. Patented May 15, 1917.

No Drawing. Original application filed May 23, 1912, Serial No. 699,232. Divided and this application filed July 10, 1915. Serial No. 39,188.

*To all whom it may concern:*

Be it known that I, WILLIAM G. LINDSAY, a citizen of the United States, residing at Caldwell, in the county of Essex and State of New Jersey, have invented certain new and useful Improvements in Processes of Making Acetyl-Cellulose Plastic Compounds, of which the following is a specification.

This is a division of my application Serial No. 699,232 filed May 23, 1912.

The various compositions to which the present invention relates are employed in the arts, sometimes as imitations of natural substances and sometimes as films which are used for photographic purposes—as the base upon which the sensitive coating is superimposed. Although the final or useful form of the different compounds of acetyl cellulose is that of a solid or dry material, the different processes of conversion into this final solid form involve, as is well understood, the employment of solutions or mixtures of varying consistencies as to elasticity, stiffness, or fluidity, depending generally upon the proportion or kind of solvent used to the amount of the original base—acetyl cellulose.

In the treatment of acetyl cellulose for the production of flexible or plastic compounds I have discovered that water, methyl alcohol and benzol in admixture form a useful and very strong solvent for acetyl cellulose of that variety which is freely soluble in acetone. My invention lies in the discovery that methyl alcohol, water, and benzol, when mixed in certain proportions, combine to produce a liquid which is a solvent for the described variety of acetyl cellulose at ordinary or room temperature, say 20° C., and that the use of this solvent under certain conditions for the manufacture of acetyl cellulose plastic compounds affords means of producing a material having great toughness, flexibility, and to a very large extent freedom from brittleness. The qualities thus imparted to the finished material I have found further are of a permanent nature and that the product when thoroughly seasoned is well adapted for carving, molding, and polishing.

I have also discovered that this solvent may be employed for the manufacture of a non-inflammable plastic composition which will possess toughness, flexibility, and freedom from brittleness to a marked degree, and this I have formed the subject of a separate application.

It could not be foretold that a mixture of water, methyl alcohol and benzol would when added to an acetyl cellulose of the variety described produce a gelatinated mass, and again it could not be foretold that the addition of paraethyltoluolsulfonamid to this mixture would produce a mass which could be rolled, pressed, and molded. On the contrary, it would be expected that a mixture of water and methyl alcohol with benzol would yield upon evaporation a residue high in benzol and water and would be useless as a solvent for acetyl cellulose. As a matter of fact, however, I have not only discovered that the water-benzol-methyl alcohol mixture in certain proportions is a solvent for acetyl cellulose in the cold, or at ordinary room temperature, but that such a mixture when used with the acetyl cellulose described and certain substances such as paraethyltoluolsulfonamid evaporates substantially unchanged with very little, if any, diminution in its solvent action;—that is, whatever change (if any) takes place in the composition of the mixed solvent during evaporation, its use as a solvent in the manufacture of acetyl cellulose plastics is not impaired.

In order to carry out my invention a good example of the process to be pursued is as follows:

To 100 parts of acetyl cellulose of the variety described, I add from 50 to 100 parts of a mixture composed of from 54 to 61 parts, by weight, of the so-called "commercial C. P." benzol and 46 to 39 parts, by weight, of a methyl alcohol of a sertngth of from 93% to 96.5%. Other proportions will produce gelatinization, but these proportions work best with paraethyltoluosulfonamid. At ordinary room temperature there results a more or less gelatinous mass depending upon the amount of solvents used, in which the particles of acetyl cellulose in a comparatively short time become completely agglomerated or amalgamated, losing their original shape and coalescing without the action of either heat or pressure. To the gelatinated mass thus produced, I add from 30 to 50 parts of paraethyltoluolsulfonamid—the larger the proportion the more flexible and plastic (under heat) will be the final material—and by the aid of a malaxator or other suitable kneading machine I obtain a uniform mixture. The mass thus produced is further worked up according to the well-known processes for making nitro-cellulose-camphor compounds.

By paraethyltoluolsulfonamid, I mean the compound having the following structural formula:—

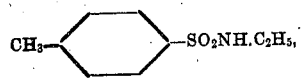

the same being an alkylated aromatic sulfonamid.

Having thus described my invention, what I claim is:

1. The process of producing plastic compounds from acetyl cellulose of that variety which is freely soluble in acetone that consists in adding to such acetyl cellulose water, benzol, and methyl alcohol to produce a gelatinated mass at ordinary room temperature; adding paraethyltoluolsulfonamid to such gelatinated mass and mixing the ingredients; and subjecting the resulting product to manipulation.

2. The process of producing plastic compounds from acetyl cellulose which consists in treating acetyl cellulose of that variety which is freely soluble in acetone, with water, benzol, methyl alcohol and paraethyltoluolsulfonamid; and manipulating the mass.

3. The process of producing plastic compounds from acetyl cellulose of that variety which is freely soluble in acetone that consists in adding to such acetyl cellulose, water, benzol, and methyl alcohol to produce a gelatinated mass at ordinary room temperature; adding an alkylated aromatic sulfonamid to such gelatinated mass and mixing the ingredients; and subjecting the resulting product to manipulation.

4. The process of producing plastic compounds from acetyl cellulose which consists in treating acetyl cellulose of that variety which is freely soluble in acetone, with water, benzol, methyl alcohol and an alkylated aromatic sulfonamid, and manipulating the mass.

5. The process of producing plastic compounds from acetyl cellulose which consists in treating acetyl cellulose of that variety which is freely soluble in acetone, with a mixture of water, benzol and methyl alcohol, adapted to produce a gelatinated mass at room temperature; and incorporating with said mass a substance which produces a mass that can be rolled, pressed and molded and which prevents the loss of the solvent effect as the water, benzol and methyl alcohol evaporate during such manipulation.

6. The process of producing plastic compounds from acetyl cellulose which consists in treating acetyl cellulose of that variety which is freely soluble in acetone, with a mixture of water, benzol and methyl alcohol, adapted to produce a gelatinated mass at room temperature.

7. The process of producing plastic compounds from acetyl cellulose which comprises:—treating 100 parts of acetyl cellulose of that variety which is freely soluble in acetone, with 50 to 100 parts of a mixture comprising water, benzol and methyl alcohol, to produce a gelatinated mass; and incorporating with said mass a substance which produces a mass that can be rolled, pressed and molded and which prevents the loss of the solvent effect as the water, benzol and methyl alcohol evaporate during such manipulation.

8. The process of producing plastic compounds from acetyl cellulose which comprises:—treating 100 parts of acetyl cellulose of that variety which is freely soluble in acetone, with 50 to 100 parts of a mixture comprising about 54 to 61 parts by weight of benzol and about 46 to 39 parts by weight of methyl alcohol, containing water to the extent of about $3\frac{1}{2}$ to 7% of the alcohol, to produce a gelatinated mass; and incorporating with said mass a substance which produces a mass that can be rolled, pressed and molded and which prevents the loss of the solvent effect as the water, benzol and methyl alcohol evaporate during such manipulation.

In testimony whereof I affix my signature.

WILLIAM G. LINDSAY.